X0009691
E. G. CURRIER.
COOKING STOVE.
Patented June 2, 1836.
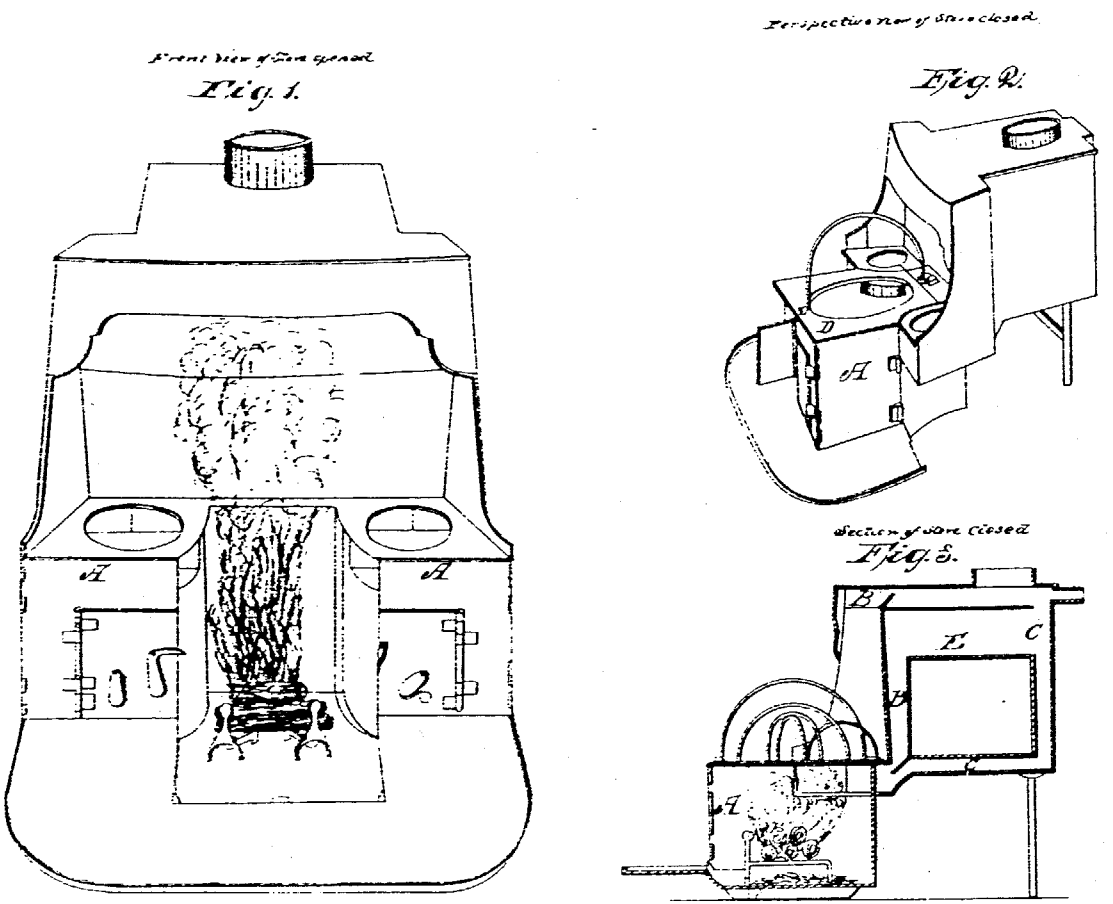

9691X June 2 1836 [illegible]

* Ezekiel G. Currier of Warner New Hampshire

Letters Patent.

The schedule referred to in these Letters Patent and making part of the same containing a description in the words of the said Ezekiel G. Currier himself of his improvement in the open and close cooking stove No. 2, To all to whom these presents shall come Be it known that I Ezekiel G. Currier of Warner in the County of Merrimack, and State of New Hampshire have invented a new and useful combination and arrangement of the several parts of the "Open and Close Stove" designated as No. 2, by which they are so contrived as to be used for either the one or other purpose in a manner well adapted to domestic economy.

The front of this combined stove has the same general appearance as that of the other arrangement, which I have also patented, and therein designated as No. 1: being like the ordinary Franklin stove, when used as an open one but may likewise be converted into a close one, by the following manner of construction, wherein. —— I shall point out the difference between this one and the other, patented and described under a previous date, —

The sides or jamb of this Franklin are not to be extended horizontally as for the other one — but will continue straight up, consequently present ing no means of support for cooking vessels there; but at about the same horizontal line on which they would have been; is placed a flange across each side or jamb so as to receive the top plate of the close stove to rest on it. The flue or draught into the back apartment is consequently immediately through the back of the close stove, which consists of that part of the back of the Franklin which is usually made perpendicular and is to be below the flanges above mentioned, being divided longitudinally so that the upper half of this back plate shall work as a damper, by a hinge joint on the top of the lower one, the handle of the axis passing through the jamb for that purpose; — When the open stove is required, this damper is shut up, or brought to a perpendicular, and consequently the draught

* Additional improvement added, 8th November 1835.

follows the usual course of the Franklin and passes out behind the top plate, under the opening for the water vessel as in my first arrangement But when the close stove is desired then the damper being opened outward from the back, admits the draught at once into the top of the apartment which surrounds the oven, according to the similar construction of the former described patent; there being this difference in the situation of the said apartment, that it is in this instance placed on the bed or bottom plate of the stove & rises to about the same level as the top plate thereof, the remaining space above is left open, and a hollow cylinder connects the back part of the top plate of the close stove with the under part of the lower plate of the draught passage leading from the Franklin top to the water vessel, so that, the draught from the close stove opens into the space above the oven, & continues on past the dampers placed across the space from end to end of the oven, and upwards through the cylinder into the escape pipe placed on the top thereof as in the first described patent. These dampers operate so as to close or open the communication over the oven, & for that purpose have each a handle projecting above the end of this oven resting on the side plate, the other end being supported by a division plate set up vertically, & continuing on under the cylinder to the back side of the apartment. When it is desired to force the draught underneath the oven, these dampers are raised upright which shuts off the current, & it then descends the space behind the Franklin or close stove back; thence underneath, & again up the back of the oven, into the cylinder beneath the water vessel and out at the escape pipe. The oven is furnished with a door situated as that of the first described patent, & on the top plate of the apartment adjoining the first described damper, are openings for the insertion of cooking vessels as usual. The front of the Franklin is closed into a close stove, by using semicircular sides which are hung upon the edges of the jambs by hinges so as to fold entirely back when not wanted, or can be brought forward and closed round flanges left on the hearth, or bed plate for that purpose; each one to contain a door to the stove. A top plate perforated for cooking vessels shuts over them as in the first described patent, having also a handle, fitting into a staple & year, as therein stated; and the whole thus presenting a round pointed stove, to be furnished with legs, & scrapers & rods as in the other mode of arrangement. The oven will also contain holes for the escape of steam &c.

What I claim as my invention, is not the principle of changing an open to a close stove, But the peculiar arrangement I have above specified by which I arrive at the change of form so as to connect the moveable sides, and top piece into a close stove, from an open one, & the adaptation of the dampers & flues as set forth, to open the draught into the apartment, & there manage it in its circulation around the oven, & out at the escape pipe, as may be desired; which arrangements when so combined wile to the best of my knowledge & belief appear to be new and not heretofore used.

In testimony that the above is a full description of my Improvement I have hereunto set my hand this twelfth day of April, 1836.

Witnesses
Frankn. Pierce.
D. A. Hall.

Ezekiel G. Currier

Drawing.

1078 [illegible]

(Patented June 2. 1836)

[illegible]